United States Patent Office 3,261,834
Patented July 19, 1966

3,261,834
TRIAZINE DIXANTHATE THIOPHOSPHATES
Arthur M. Imel, Richmond, Calif., and Richard C. Maxwell, Pullman, Wash., assignor to Stauffer Chemical Company, New York, N.Y., a corporation of Delaware
No Drawing. Filed Dec. 3, 1963, Ser. No. 327,803
7 Claims. (Cl. 260—248)

This invention relates to certain new compositions of matter and their use as insecticides.

More particularly, the compounds of the present invention are of the formula:

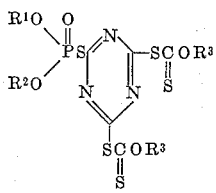

wherein $R^1$ and $R^2$ are lower alkyls and $R^3$ is a radical selected from the group consisting of lower alkyl, lower alkenyl and aralkyl.

These compounds of the present invention have demonstrated their insecticidal activity against houseflies, American roaches and milkweed bugs as will be further amplified in examples to follow.

The compounds of the present invention are prepared by first reacting cyanuric chloride with the appropriate dialkoxyphosphorothioate to obtain the desired substituted 4,6-dichloro-s-triazine. This reaction product is then reacted with the appropriate potassium or sodium xanthate salt to obtain the desired compound of the present invention as shown by the following equations.

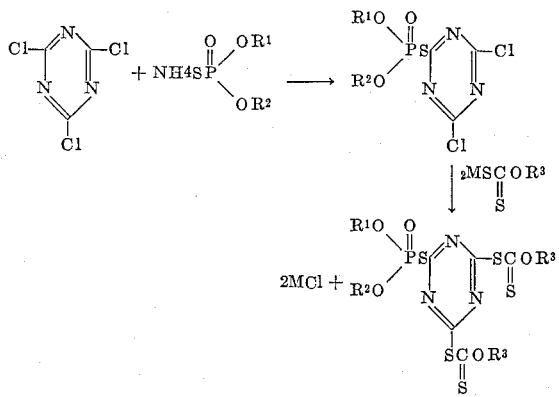

wherein $R^1$ and $R^2$ are lower alkyls, $R^3$ is an alkyl, alkenyl or aralkyl and M is potassium or sodium.

EXAMPLE 1

*2(O,O-diethylphosphorothiolyl)-4,6-bis(isopropyl-xanthyl)-s-triazine (R-4356)*

Into a 3-neck flask equipped with a stirrer and condenser was added 15.8 g. (0.05 mole) of 2(O,O-diethylphosphorothiolyl)-4,6-dichloro-s-triazine, 17.4 g. (0.10 mole) of potassium isopropylxanthate, and 400 cc. of benzene. The reaction mixture was heated with stirring at reflux temperature for about 16 hours, after which time the resulting orange solution was filtered and the filtrate concentrated on a steam bath with an air jet yielding 24 g. (95%) of orange oil, $n_D^{30} = 1.5844$.

Analysis:

|  | Calculated | Found |
|---|---|---|
| Percent C | 35.90 | 36.18 |
| Percent H | 4.82 | 5.05 |
| Percent N | 8.33 | 8.22 |
| Percent P | 6.16 | 6.12 |
| Percent S | 31.90 | 31.54 |

EXAMPLE 2

Using an analogous procedure and appropriate xanthate salts, additional members of this class were prepared:

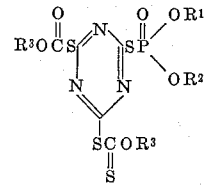

|  | $R^1$ | $R^2$ | $R^3$ | $n_D^{30}$ |
|---|---|---|---|---|
| R-4355 | ethyl | ethyl | methyl | 1.5072 |
| R-4360 | do | do | allyl | 1.5926 |
| R-4477 | do | do | benzyl | 1.5352 |
| R-4480 | do | do | n-propyl | 1.5665 |
| R-4474 | do | do | n-butyl | 1.5572 |

These compounds have been tested as insecticides and as acaricides according to the following methods:

*Acaricidal evaluation test.*—The two-spotted mite, *Tetranychus telarius* (Linn.) is employed in tests for acaricides. Young pinto bean plants are infested with several hundred mites. Dispersions of test compounds are prepared by dissolving 0.12 gram of the toxic material in ten milliliters of acetone. This solution is then diluted with water containing 0.0175% v./v. of Tween R 20, an emulsifier, the amount of water being sufficient to give concentrations of active ingredient of 0.12%. The test suspensions are then sprayed on the infested pinto bean plants. After seven and fourteen days, the plants are examined both for post-embryonic forms of the mite as well as for eggs. The percentage of kill is determined by comparison with control plants which have not been sprayed and the LD–50 value calculated using well-known procedures. LD–50 values are reported under the columns "2SM" in the table; "PE" indicates the post-embryonic forms while "E" indicates eggs.

*Insecticidal evaluation tests.*—Three insect species are subjected to evaluation tests for insecticides:

(1) American cockroach (Roach) *Periplaneta americana* (Linn.).

(2) Large milkweed bug (MWB) *Oncopeltus fasciatus* (Dallas).

(3) Housefly (HF) *Musca domestica* (Linn.).

Test insects are caged in cardboard mailing tubes 3⅛ inches in diameter and 2⅝ inches tall. The mailing tubes are supplied with cellophane bottoms and screened tops. Ten to twenty-five insects are used per cage. Food and water are supplied to each cage. The caged insects are sprayed with the active compound at various concentrations. After twenty-four and seventy-two hours, counts are made to determined living and dead insects.

Housefly evaluation tests differ in this respect: The toxicant is dissolved in a volatile solvent, preferably acetone, the active compound is pipetted into a petri dish bottom, allowed to dry and is placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well-known procedures.

Results of such testing methods are expressed in the following table:

| Compound | HF | Roach, percent | MWB, percent | 2 SM | |
|---|---|---|---|---|---|
| | | | | PE, percent | E |
| R-4355 | 50 µg. | 0.1 | 0.03 | [1] 0 | [1] 0 |
| R-4356 | 30 µg. | 0.05 | 0.05 | 0.1 | [1] 0 |
| R-4360 | 30 µg. | 0.05 | 0.03 | [1] 0 | [1] 0 |
| R-4474 | 0.1% | [2] 0 | 0.05 | 0.12 | [1] 0 |
| R-4477 | 30 µg. | 0.1 | 0.05 | [1] 0 | [1] 0 |
| R-4480 | 30 µg. | 0.05 | 0.03 | 0.12 | [1] 0 |

[1] No activity at 0.12%.
[2] No activity at 0.1%.

The compounds of the present invention may be applied to a pest habitat in ways well known to those skilled in the art, such as dusts, sprays of solutions or dispersions and the like.

We claim:
1. A compound of the formula

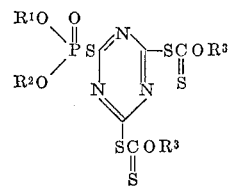

wherein $R^1$ and $R^2$ are lower alkyls and $R^3$ is a radical selected from the group consisting of lower alkyls, lower alkenyls and phenyl substituted lower alkyls.

2. 2- (O,O - diethylmonothiophosphoryl) - 4,6 - bis-(methylxanthyl)-s-triazine.

3. 2-(O,O-diethylmonothiophosphoryl)-4,6-bis-(isopropylxanthyl)-s-triazine.

4. 2-(O,O-diethylmonothiophosphoryl)-4,6 - bis(allyl-xanthyl)-s-triazine.

5. 2-(O,O-diethylphosphorothiolyl)-4,6-bis - (n - butyl-xanthyl)-s-triazine.

6. 2-(O,O-diethylphosphorothiolyl)4,6 - bis - (benzyl-xanthyl)-s-triazine.

7. 2-(O,O-diethylphosphorothiolyl)-4,6-bis(n - propyl-xanthyl)-s-triazine.

References Cited by the Examiner
UNITED STATES PATENTS
3,076,807   2/1963   Fancher et al. _____ 260—248

WALTER A. MODANCE, *Primary Examiner.*

J. M. FORD, *Assistant Examiner.*